United States Patent
Holten et al.

(10) Patent No.: US 9,043,238 B2
(45) Date of Patent: May 26, 2015

(54) DATA VISUALIZATION SYSTEM

(71) Applicant: SynerScope B.V., S-Hertogenbosch (NL)

(72) Inventors: Danny Hubertus Rosalia Holten, Kerkrade (NL); Johannes Cornelius Adrianus Buenen, S-Hertogenbosch (NL)

(73) Assignee: SYNERSCOPE B.V., S-Hertogenbosch (NL)

( * ) Notice: Subject to any disclaimer, the term of this patent is extended or adjusted under 35 U.S.C. 154(b) by 0 days.

(21) Appl. No.: 14/093,690

(22) Filed: Dec. 2, 2013

(65) Prior Publication Data

US 2014/0139546 A1 May 22, 2014

Related U.S. Application Data

(63) Continuation-in-part of application No. 13/102,648, filed on May 6, 2011, now Pat. No. 8,768,804.

(51) Int. Cl.
*G06Q 40/00* (2012.01)
*G06T 11/20* (2006.01)

(52) U.S. Cl.
CPC .............. *G06T 11/206* (2013.01); *G06Q 40/00* (2013.01)

(58) Field of Classification Search
CPC ....... G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 6,934,858 B2 | 8/2005 | Woodhill | |
| 7,024,419 B1 | 4/2006 | Klenk et al. | |
| 7,124,302 B2 | 10/2006 | Ginter et al. | |
| 7,360,686 B2 * | 4/2008 | Hoch et al. ................... | 235/379 |
| 7,401,057 B2 | 7/2008 | Eder | |
| 7,606,168 B2 | 10/2009 | Robinson et al. | |
| 7,617,185 B2 | 11/2009 | Werner et al. | |
| 7,777,743 B2 | 8/2010 | Pao et al. | |
| 7,809,659 B1 | 10/2010 | Paiz | |
| 7,849,408 B1 | 12/2010 | Messinger et al. | |

(Continued)

OTHER PUBLICATIONS

Danny Holten, "Hierarchical Edge Bundles: Visualization of Adjaceny Relations in Hierarchical Data", IEEE Transactions on Visualization and Computer Graphics, vol. 12, No. 5, Sep./Oct. 2006.
Danny Holten, "A User Study on Visualizing Directed Edges in Graphs", CHI 2009, Apr. 4-9, 2009, Boston, MA pp. 1-10.

(Continued)

*Primary Examiner* — Frantzy Poinvil
(74) *Attorney, Agent, or Firm* — Kenealy Vaidya LLP

(57) ABSTRACT

The present invention provides a method implemented by a computer for generating an image on a display that represents a plurality of transactions as lines connecting points in the display indicative of a source and an origin for the respective transactions. For each of the lines, an anti-aliasing process is used to determine a coverage value for each pixel of the display that represents the extent to which the line covers each pixel, and a record of a cumulative coverage value for each pixel is maintained in an image buffer. When the lines have been rendered into the image buffer, the method comprises determining a maximum and a minimum of the cumulative coverage values stored in the image buffer, scaling the cumulative coverage value for each pixel, and rendering each pixel onto the display by using the scaled cumulative coverage value to determine a transparency for the pixel.

20 Claims, 7 Drawing Sheets

(56) References Cited

U.S. PATENT DOCUMENTS

| | | | |
|---|---|---|---|
| 8,001,055 B2* | 8/2011 | Weiss | 705/76 |
| 2004/0234117 A1* | 11/2004 | Tibor | 382/137 |
| 2005/0080655 A1 | 4/2005 | Sengir et al. | |
| 2005/0192926 A1 | 9/2005 | Liu et al. | |
| 2007/0005967 A1 | 1/2007 | Mister | |
| 2007/0171716 A1 | 7/2007 | Wright et al. | |
| 2008/0203170 A1 | 8/2008 | Hammad | |
| 2009/0125543 A1 | 5/2009 | Patil et al. | |
| 2009/0313041 A1 | 12/2009 | Eder | |
| 2010/0077352 A1 | 3/2010 | Heer et al. | |
| 2011/0055074 A1 | 3/2011 | Chen et al. | |
| 2012/0041790 A1 | 2/2012 | Koziol | |
| 2013/0097043 A1* | 4/2013 | Boncyk et al. | 705/26.1 |
| 2013/0246256 A1* | 9/2013 | Boncyk et al. | 705/39 |

OTHER PUBLICATIONS

Bas Cornelissen et al., "Execution Trace Analysis through Massive Sequence and Circular Bundle Views", (http://www.west.nl/), pp. 1-40.

Danny Holten, "Visualization of Graphs and Trees for Software Anaylsis", May 20, 2009, 163 pages.

Wikipedia: "Framebuffer", Internet article, Jan. 31, 2011.

Holten, et al., "Trace visualization using hierarchical edge bundles and massive sequence views", Visualizing Software for Understanding and Analysis, 4th IEEE International Workshop, pp. 47-54, Jun. 2007.

Draper, et al., "A survey of radial methods for information visualization", IEEE Transactions on Visualization and Computer Graphics, IEEE Service Center, Sep. 1, 2009.

* cited by examiner

DATA VISUALIZATION SYSTEM

CROSS-REFERENCE TO RELATED APPLICATIONS

This application is a continuation-in-part of U.S. patent application Ser. No. 13/102,648, entitled "DATA ANALYSIS SYSTEM" and filed May 6, 2011, the contents of which are incorporated in their entirety by reference.

FIELD OF THE INVENTION

The present application concerns a data visualization system.

More specifically embodiments of the present application concern methods and apparatus for visualizing large dynamic graphs to enable patterns, deviations and anomalies to be identified.

BACKGROUND TO THE INVENTION

Big data is the term used to describe massive volumes of both structured and unstructured data that are so large that they are difficult to process using traditional database and data processing techniques. However, big data is becoming increasingly important, as the volume of data available grows rapidly due to the near ubiquitous availability of the Internet and data-generating devices, such as mobile phones and tablet computers. In addition, with the rapid growth of big data has come the recognition that the analysis of larger data sets can lead to more accurate analysis.

This is particularly true for transaction-related data, wherein a transaction is an exchange or interaction between two entities. Transaction data will therefore comprise a record of each transaction that defines the source and destination of the transaction, and further details of the transaction such as the date and/or time of the transaction, the content/subject of the transaction, the size/volume of the transaction etc. The processing and analysis of the transaction related data can therefore be extremely useful for identifying deviations or anomalies from normal or expected patterns of transactions that can be indicative of issues arising within the system that generated the transactions. For example, transactions for which such analysis would be particularly useful may include financial, accounting, insurance, security trading, security access and phone or computer mediated transactions.

A particular challenge when dealing with vast amounts of transaction-related data involves the visualization of this data, and the interrogation of such visualizations for analysis purposes. Generating visualizations of such vast amounts of data will typically require a significant amount of processing power, otherwise the time taken to generate a visualization will be too long to be of sufficient use. This is especially problematic when dynamic interrogation of a visualization is necessary in order for a worthwhile analysis to be performed. In addition, when visualizing vast amounts of data, clutter quickly becomes a problem due to the physical limitations (e.g. size and resolution) of the screens on which visualizations can be displayed, such that a large proportion of the detail of the individual transactions is lost. It can then become extremely difficult to extract any useful information from a data visualization. Furthermore, even if the size and/or resolution of the displays are increased, thereby providing more pixels with which to display a data visualization, there is a limit to human visual cognition, both in terms of the size of image that we can process and our visual acuity. Consequently, the generation of visualizations of vast amounts of transaction-related data is far from trivial, and increasing the efficiency with which a visualization is generated and the efficiency with which a visualization can convey information is highly desirable and technically challenging.

SUMMARY OF THE INVENTION

In accordance with one aspect of the present invention there is provided a method implemented by a computer for generating an image on a display that comprises a plurality of pixels, the image representing a plurality of transactions as lines connecting points in the display indicative of a source and an origin for the respective transactions. The method comprises successively rendering lines representing each of the plurality of transactions into an image buffer. The rendering comprises, for each of the lines, using an anti-aliasing process to determine a coverage value for each pixel of the display, the coverage value representing the extent to which the line covers each pixel, and within the image buffer maintaining a record of a cumulative coverage value for each pixel of the display. When the lines representing each of the plurality of transactions have been rendered into the image buffer, the method comprises determining a maximum and a minimum of the cumulative coverage values stored in the image buffer, scaling the cumulative coverage value for each pixel based on the maximum and minimum cumulative coverage values, and rendering each pixel onto the display by using the scaled cumulative coverage value to determine a transparency for the pixel.

The step of scaling the cumulative coverage value for each pixel based on the maximum and minimum cumulative coverage values can use any of a linear scaling function and a non-linear scaling function. The step of scaling the cumulative coverage value for each pixel based on the maximum and minimum cumulative coverage values may use any of a logarithmic scaling function and an exponential scaling function.

The method may further comprise, when rendering the lines representing each of the plurality of transactions, for each of the plurality of lines, determining color values for each pixel of the display, the color values defining the color of the line at the location corresponding to each pixel, and within the image buffer maintaining a record of cumulative color values for each pixel of the display. When the lines representing each of the plurality of transactions have been rendered into an image buffer, converting the cumulative color values for each pixel into color data values based on the cumulative coverage value for the pixel, and rendering each pixel onto the display using the color data values.

The step of converting the cumulative color values for each pixel based on the cumulative coverage value for the pixel may comprise, for each pixel, dividing each cumulative color value associated with the pixel by the cumulative coverage value associated with the pixel.

The step of maintaining a record of cumulative color values for each pixel of the display may comprise scaling the color values of the line at the location corresponding to each pixel by the coverage value of the line at the location corresponding to the pixel, and incrementing each cumulative color value by the scaled color value.

The color values for each pixel may comprise a red channel value, a green channel value, and a blue channel value (RGB). The coverage value may be an alpha (A) channel value. The image buffer may store a RGBA tuple for each pixel of the display, the RGBA tuple including a red (R) channel value, a green (G) channel value, a blue (B) value, and an alpha (A) channel value.

The image buffer may store the cumulative coverage value of each pixel of the display as a floating point number. The image buffer may store the cumulative color values of each pixel of the display as a floating point number.

The method may comprise, when lines representing transactions are rendered into one of a plurality of image buffers and the step of rendering each pixel onto the display may comprise, for each pixel, combining the values from each of the plurality of image buffers and rendering each pixel onto the display using the combined value. The values from each of the plurality of image buffers may be combined into a blended image using an alpha blending process. The method may further comprise, for each of the lines, determining a type for the transaction represented by the line and, depending upon the determined type, rendering the line representing the transaction into one or more of the plurality of image buffers that are associated with the determined type.

The method may further comprise updating the image on the display utilizing a user input identifying a subset of the plurality of transactions by rendering lines representing each of the transactions in the subset into one of the plurality of image buffers, combining values from each of the plurality of image buffers, and re-rendering pixels onto the display using the combined values to generated an updated image. The step of combining values from each of the plurality of image buffers may comprise cumulatively combining the color data values for each of the pixels from each of the plurality of image buffers. The step of combining values from each of the plurality of image buffers may comprise, for each of the pixels, determining a complementary color to that of a color of the pixel of the image, and including the complementary color when combining the color data values for the pixel from each of the plurality of image buffers. The user input identifying a subset of the plurality of transactions may specify a type for the transactions in the subset, and the lines representing each of the transactions in the subset are rendered into one of the plurality of image buffers that is associated with the specified type.

According to a second aspect of the present invention there is provided a data analysis computer system for generating an image on a display that comprises a plurality of pixels, the image representing a plurality of transactions as lines connecting points in the display indicative of a source and an origin for the respective transactions. The computer system comprises a graphics buffer operable to provide an image buffer for storing image data, a display screen operable to display the image data provided by the graphics buffer, and a processing module operable to successively render lines representing each of the plurality of transactions into an image buffer. The rendering comprises for each of the lines, using an anti-aliasing process to determine a coverage value for each pixel of the display, the coverage value representing the extent to which the line covers each pixel; and within the image buffer maintaining a record of a cumulative coverage value for each pixel of the display. When the lines representing each of the plurality of transactions have been rendered into the image buffer, the processing module is operable to determine a maximum and a minimum of the cumulative coverage values stored in an image buffer, scale the cumulative coverage value for each pixel based on the maximum and minimum cumulative coverage values, and cause each pixel to be rendered onto the display by using the scaled cumulative coverage value to determine a transparency for the pixel.

According to a third aspect of the present invention there is provided a non-transitory computer readable medium storing computer implementable instructions which when implemented by a programmable computer cause the computer to generate an image on a display that comprises a plurality of pixels, the image representing a plurality of transactions as lines connecting points in the display indicative of a source and an origin for the respective transactions by successively rendering lines representing each of the plurality of transactions into an image buffer. The rendering comprises for each of the lines, using an anti-aliasing process to determine a coverage value for each pixel of the display, the coverage value representing the extent to which the line covers each pixel; and within the image buffer maintaining a record of a cumulative coverage value for each pixel of the display. The rendering further comprises, when the lines representing each of the plurality of transactions have been rendered into the image buffer, determining a maximum and a minimum of the cumulative coverage values stored in an image buffer, scaling the cumulative coverage value for each pixel based on the maximum and minimum cumulative coverage values, and rendering each pixel onto the display by using the scaled cumulative coverage value to determine a transparency for the pixel.

BRIEF DESCRIPTION OF THE DRAWINGS

Embodiments of the present invention will now be described in detail with reference to the accompanying drawings in which.

DESCRIPTION OF THE EMBODIMENTS

Figure 1:
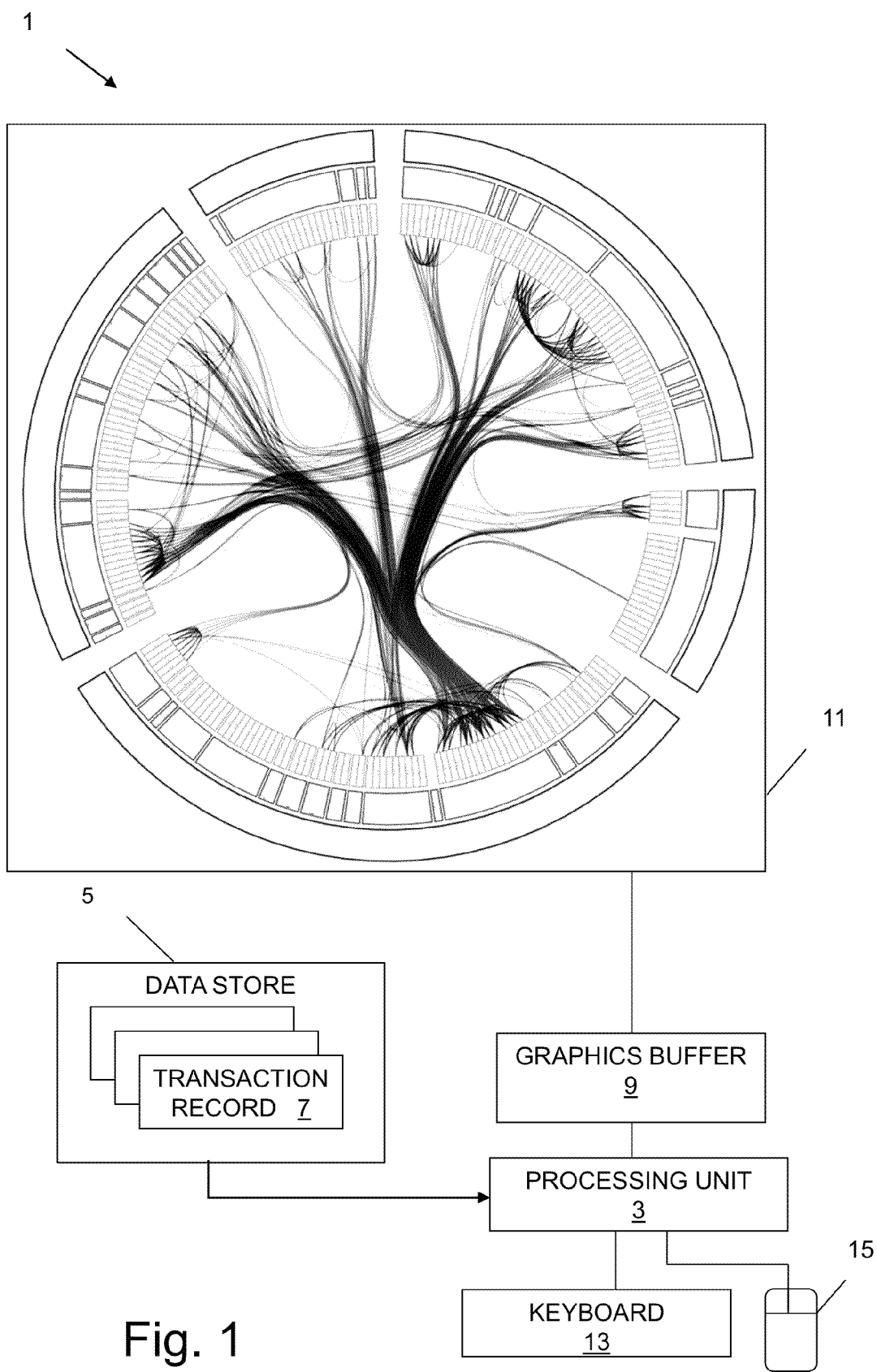
FIG. 1 is a schematic block diagram of a data visualization system accordance with an embodiment of the present invention.

FIG. 1 is a schematic block diagram of a data visualization system 1 in accordance with an example embodiment of the present invention. In this embodiment the data visualization system 1 comprises a data store 5 arranged to store transaction records 7 each identifying a first and a second interacting element for a transaction and a processing unit 3 arranged to retrieve data from data store 5 and generate a graphic representation representing the transactions as lines/curves on a user interface where the end points of the lines indicate the interacting elements identified by the transactions. This generated display data is then passed by the processing unit 3 to a graphics buffer 9 connected to the processing unit 3 and a display 11 and is then used by the graphics buffer 9 to represent the data in the transaction records being analyzed. In addition the processing module 3 is also responsive to user input via a keyboard 13 and a mouse 15 to enable a user to interact with the display and select groups of transactions for processing.

In the example illustrated in FIG. 1, the user interface shown schematically on the display 11 shows the curved lines as connecting points at the perimeter of a circle. Around the perimeter points are arranged into a hierarchy such as for example a hierarchy of locations e.g. country, region, sub-region, which can correspond to locations associated with the transactions. These are illustrated by the curved/arced sections at the perimeter of the user interface with the elements at the top of the hierarchy shown at the outside of the circle, and the lowest level of the hierarchy shown adjacent to the ends of the lines on the inside of the circle. The curved lines therefore connect points at the perimeter of the circle. Transactions sharing common portions of a hierarchy are bundled together to indicate a volume of flow between two locations. In this way, a user can select data either by selecting groups of locations or a subset of transactions etc. in order to home in on a group of suspect transactions for more investigation.

When identifying and investigating particular transactions the user interface is updated to highlight certain information. Thus for example in certain circumstances it may be desirable to distinguish between the source/origin and the destination of transactions (i.e. the first and second interacting elements of a transaction). This could enable a subset of transactions to be displayed. The screen display could then be modified to color code the representations of the transactions to highlight some other aspect of the transactions such as the timing of the transactions or the frequency or size of the transactions to make potentially suspect patterns more apparent.

Where a user interface of the type described is used to illustrate large volumes of data representing large numbers of transactions this generates a number of difficulties. Although representation of transactions using lines is a highly efficient way of illustrating a large number of transactions, any illustration is ultimately limited by the size and/or resolution of a display screen. Any individual pixel on the screen can only be assigned a single color. Additional difficulties arise when updating an image to account for a new selection of a set of transactions to be highlighted. It is desirable that the update of any images should be undertaken in an efficient manner. Where large volumes of data are to be rendered, this may not be possible. Finally, in the context of analysis of large volumes of data, it is frequently desirable to be able to identify unusual transactions or outliers. This means that in generating any display, the contributions of these unusual transactions need to be made apparent.

The applicants have appreciated these difficulties and have developed a manner of representing transaction data in the form of lines which enables large volumes of data to be illustrated with minimal loss of detail while still enabling the presence of unusual transactions to be made apparent to a user, and in which the update of the user interface/display to highlight particular transactions identified by the user can be achieved quickly with minimal additional processing.

Figure 2:
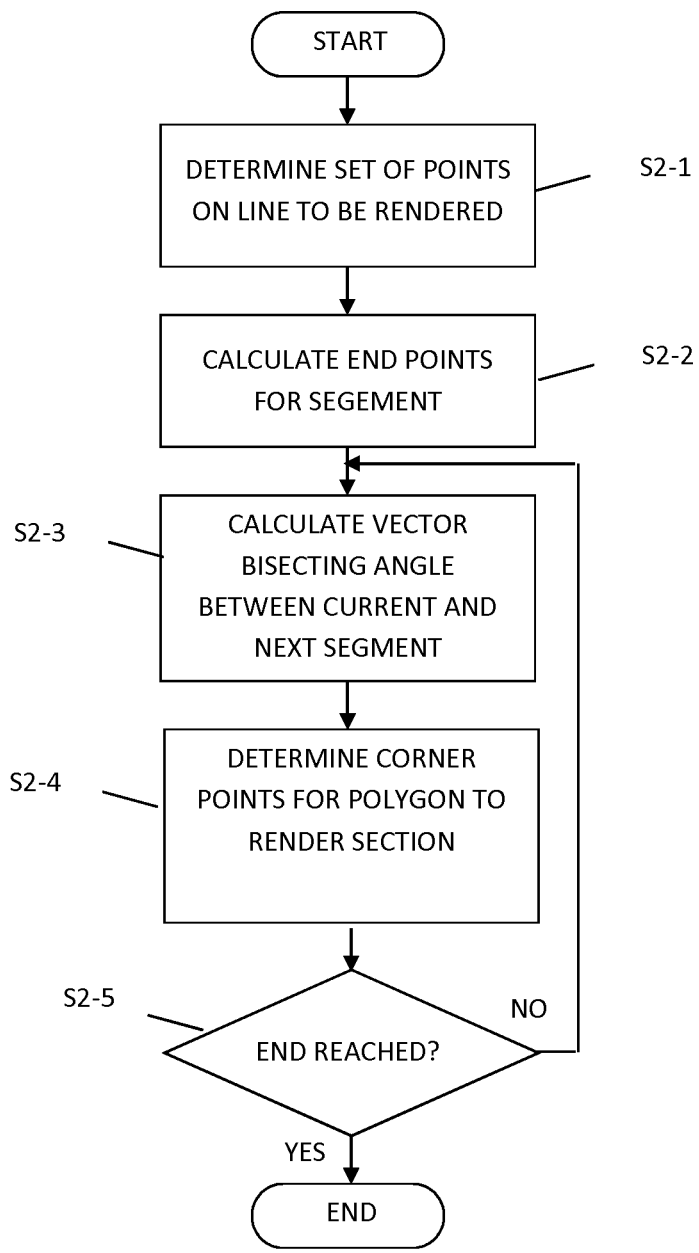
FIG. 2 is a flow diagram of the processing undertaken to determine a set of shapes to represent a curve.

Prior to describing the generation of display data in greater detail, the processing involved in drawing an individual line/curve on a display will first be described with reference to FIGS. 2 and 3. FIG. 2 is a flow diagram of the processing implemented by the processing unit 3, and FIG. 3 is an illustrative section of a line/curve to be rendered.

The lines/curve connecting the first and second interacting elements of a transaction can comprise a set of appended b-splines. Mathematically a b-spline is fully defined based solely on the co-ordinates associated with a set of control points. When rendering a b-spline as an image, it is necessary to break the mathematical curve which is to be drawn into a set of shapes which can be rendered by the computer. This is necessary because in order to be rendered the curve must be given a thickness so that the rendering of the curve can be seen.

Turning to FIG. 2, to achieve such a rendering, initially (s2-1) a set of points on the line to be rendered is determined. The co-ordinates for the points can be determined directly by processing the control co-ordinates for the b-spline for the curve to be rendered. These will comprise a set of points all of which should lie at the middle of the curve which is to be rendered.

Figure 3:
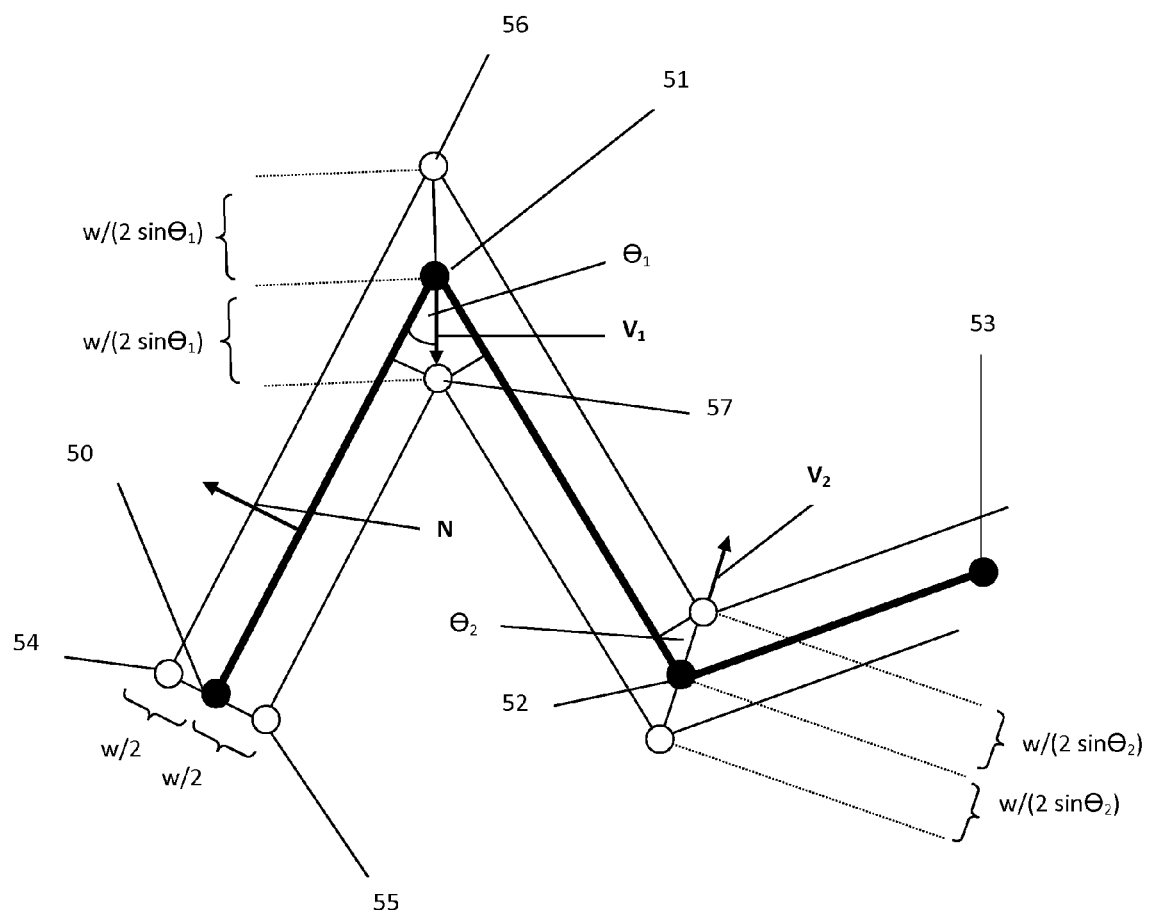
FIG. 3 is an illustrative section of a curve to be rendered.

FIG. 3 is an illustrative section of a curve to be rendered. In the illustration the points 50,51,52,53 lying on the thick black line comprise points mathematically determined to correspond to the portion of the line to be rendered.

Starting with the first point 50, the processing module then (s2-2) determines co-ordinates for the edge of the line at that point. This is achieved by determining normal (N) to a vector connecting the first 50 and second 51 points on the line a length of ±w/2 from the first point 50 and assigning these co-ordinates to the corners 54,55 of the beginning of the line to be rendered. In this way two co-ordinates 54,55 separated by a distance w corresponding to the selected width of the line to be rendered are identified where the first selected point 50 lies in the middle of the two points 54,55.

Having determined the initial end points 54, 55, the processing unit 3 then proceeds to calculate (s2-3) a unit vector ($V_1$) which bisects the angle formed by lines connecting the first 50 and second points 51 and the second 51 and third points 52 which lie on the mathematical line being rendered.

Co-ordinates for the polygon (in this example, a quadrilateral) representing an initial section of the curve are then (s2-4) determined by identifying points 56, 57 a distance $\pm w/(2 \sin \theta_1) V_1$ from the second point 51 lying on the mathematical line being rendered where $\theta_1$ is the angle between the line connecting the first and 50 second points 51 on the line being rendered and the vector $V_1$.

Having calculated co-ordinates for the polygon for rendering the first section, the processing unit 3 then checks (s2-5) to see if the complete line has now been rendered.

If this is not the case the processing unit 3 then proceeds to calculate (s2-3) a vector bisecting lines connecting the next two pairs of point on the mathematical line being rendered. Thus having processed the first 50, second 51 and third 52 points on the line the processing unit 3 will then determine a vector $V_2$ bisecting the lines connecting the second 51 and third 52 and the third 52 and fourth 53 points on the line being rendered.

Once this vector has been determined, the end points for the next polygon for representing the next section of the line is then (s2-4) determined utilizing the vector $V_2$ and the angle between the lines connecting the second 51 and third 52 and the third 52 and fourth 53 points on the line being rendered $V_2$ bisected by the vector $V_2$. After which the processing unit 3 once again checks (s2-5) whether the end of the line being rendered has been reached.

Having determined a suitable set of polygons for representing portions of a line/curve, each of the polygons is then rendered to the graphics buffer 9. When all of the lines have been rendered into the graphics buffer 9, the processing unit 3 can then cause the image stored in the graphics buffer 9 to be displayed on the display 11.

According to the methods described herein, in order to generate an image representing a plurality of transactions as lines connecting points on a display indicative of a source and an origin for the respective transactions, the display comprising a plurality of pixels, each of the plurality of lines is successively (i.e. in turn) rendered into an image buffer. For each of the lines, this rendering comprises using an anti-aliasing process to determine a coverage value for each pixel of the display, wherein the coverage value represents the extent to which the line covers each pixel.

In this regard, aliasing refers to the appearance of distortions in a generated image that occur due to the limited resolution of the display. Typically, aliasing causes the curves and diagonal lines of a generated image to appear inappropriately jagged, as the resolution is not sufficiently high enough to represent a smooth line. Anti-aliasing therefore refers to image processing techniques that minimize these distortions.

Figures 4A, 4B:
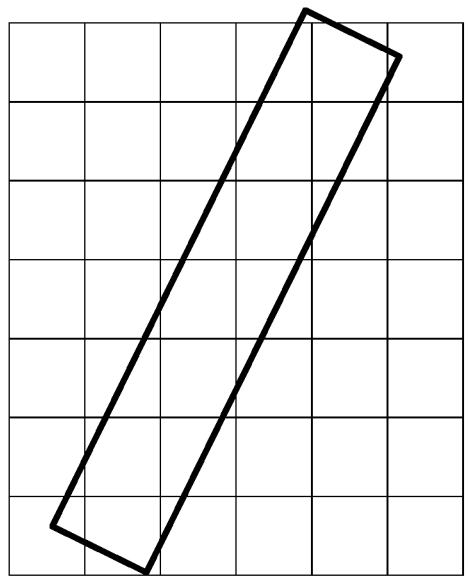
FIGS. 4A & 4B are schematic illustrations of the rendering of a polygon using anti-aliasing.

By way of example, FIGS. 4A and 4B are schematic illustrations of the rendering of a polygon that is part of a line using an anti-aliasing process. FIG. 4A illustrates the polygon to be rendered overlaid onto an array of pixels. As can be seen from this illustration, if all of those pixels that correspond with portions of the polygon were to be used to their full extent, then the representation of the polygon would have aliasing effects that cause the edges of the polygon to appear significantly jagged. These aliasing effects are reduced by applying an anti-aliasing process that effectively blends the pixels at the edges/boundaries of the polygon with the background so as to give the edges a much smoother appearance. To do so, the anti-aliasing process determines a coverage value for each pixel of the display covered by the polygon and uses this coverage value to define the opacity of the pixel. FIG. 4B therefore illustrates the array of pixels of FIG. 4A in which an anti-aliasing process has been used to determine a fractional coverage value for each of the pixels that correspond with portions of the polygon, and this fractional coverage value will define the opacity of the pixel.

Figure 5:
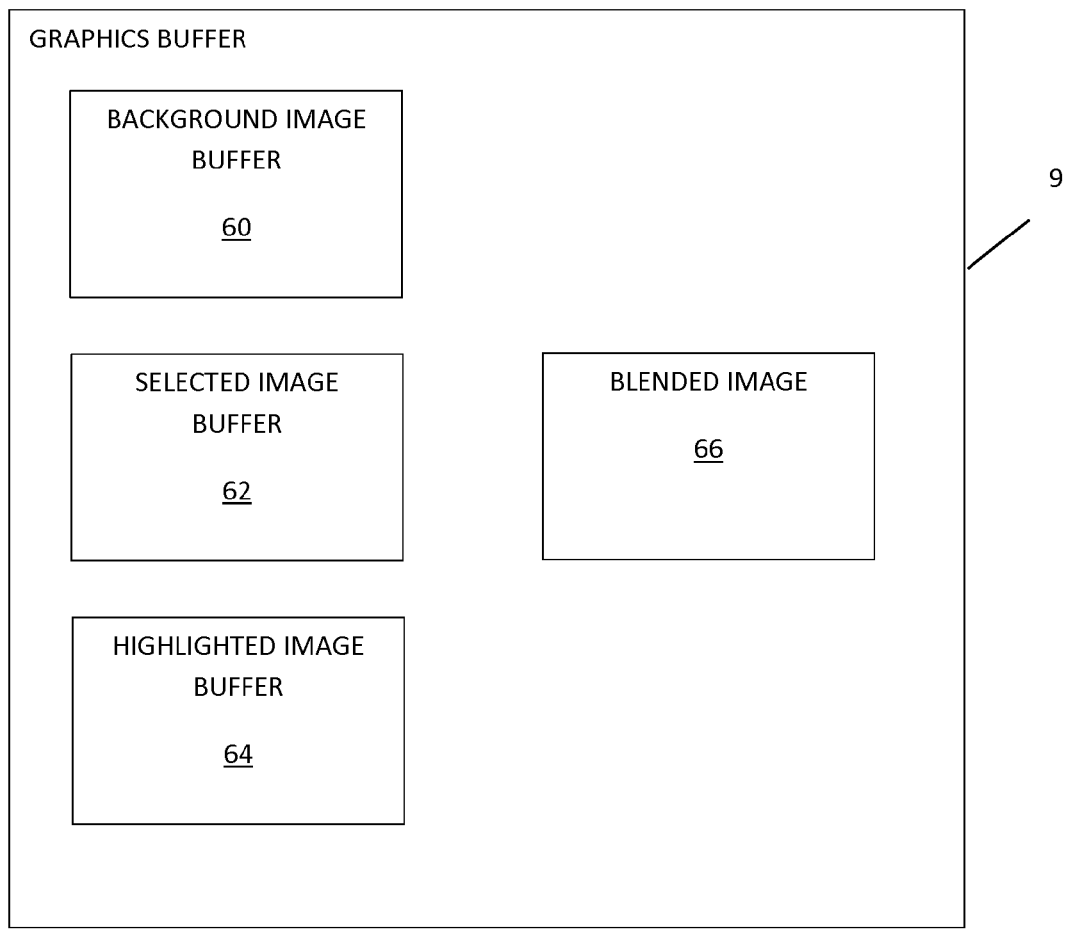
FIG. 5 is a schematic block diagram of image data stored in a graphics buffer.

Preferably, the graphics buffer 9 comprises a number of separate image buffers, as illustrated in FIG. 5. In FIG. 5, the three image buffers 60, 62, 64 in this embodiment are arranged to create image data for representing a background image, a selected image corresponding to a set of selected transactions, and a highlighted image corresponding to a set of highlighted transactions respectively. The presence of three separate image buffers simplifies the update of the display as if a user modifies the set of selected or highlighted transactions, just the content of the corresponding buffers can be updated. In this regard, the selected image would include only representations of lines corresponding to transactions that have been actively selected by user (e.g. by clicking on corresponding portions of the display using a cursor/pointer), the highlighted image would include only representations of the lines corresponding to transactions that the user has indicated are of interest in (e.g. by hovering over corresponding portions of the display with the cursor/pointer), whilst the background image would include representations of the other transactions represented on the display. Since normally only a sub-set of the lines being rendered is ever highlighted or selected this increases the speed with which the processing unit 3 can update the display.

A conventional image buffer is arranged to store an array of RGBA (red green blue alpha) tuples for each pixel of the display, with each RGBA tuple providing red (R), green (G), and blue (B) color channel values, and an alpha (A) channel value that defines the opacity/transparency of the pixel. In a conventional image buffer, each of the R, G, B, and A channel values ranges from 0 to 255 (i.e. the 256 possible values provided by 8 bits available for each channel). RGB values of 0,0,0 then typically define/represent a completely black pixel and RGB values of 255,255,255 define/represent a completely white pixel. An A value of 0 then typically defines/represents a completely transparent pixel whilst an A value of 255 defines/represents a completely opaque pixel.

According to the methods described herein, as with conventional image buffers, each of the image buffers 60, 62, 64 provided by the graphics buffer 9 comprises a data array where each point in the array corresponds to a pixel of the display. However, rather than being configured to store fixed point numbers for each value of an RGBA tuple, where each value ranges between 0 and 255, in this embodiment, each of the image buffers 60, 62, 64 provided by the graphics buffer 9 is arranged to store each value of an RGBA tuple as a floating point number which can represent values for the full dynamic range of numbers which can be processed by the processing unit 1. By way of example, the graphics buffer 9 could be arranged to store each value of an RGBA tuple as a floating point number in the range 0.0 to 1.0, wherein each value between these extremes can be specified to a multiplicity of decimal places. In this example, the color white would be encoded as RGB=1.0, 1.0, 1.0 and black as RGB=0.0, 0.0, 0.0.

When rendering a line representing a transaction to one of the image buffers, for each pixel in the image buffer, an anti-aliasing process is used to determine a coverage value for the pixel that represents the extent of coverage of the pixel by the line being rendered, and uses this coverage value to cumulatively update the values stored in the image buffer for that pixel. In this embodiment, this comprises updating the R, G, B and A values for each of the pixels in the image buffer using the following equations:

$$R=R+L_R \cdot Cov$$

$$G=G+L_G \cdot Cov$$

$$B=B+L_B \cdot Cov$$

$$A=A+Cov$$

Where R, G, B and A are the current red, green, blue and alpha channel values associated with the pixel being updated, $L_R, L_G, L_B$ are the red, green, blue and alpha channel values of the portion of the line being rendered at the location corresponding to the pixel, and Cov is the fractional coverage value defining the extent to which the line covers the pixel (i.e. determined using an anti-aliasing process). The image buffer therefore stores cumulative R, G, and B color values for each pixel, in which each color value is successively incremented by a color value of the line at that pixel that has been scaled by the determined coverage value of the line at that pixel, and a cumulative coverage value for each pixel. These cumulative values can therefore exceed the range of values that are stored for a pixel within a conventional image buffer (i.e. 0 to 255). Updating the image buffer in this way causes the image buffer to store R, G, B and A values that represent the cumulative effect of each of the lines being rendered.

Figure 6:
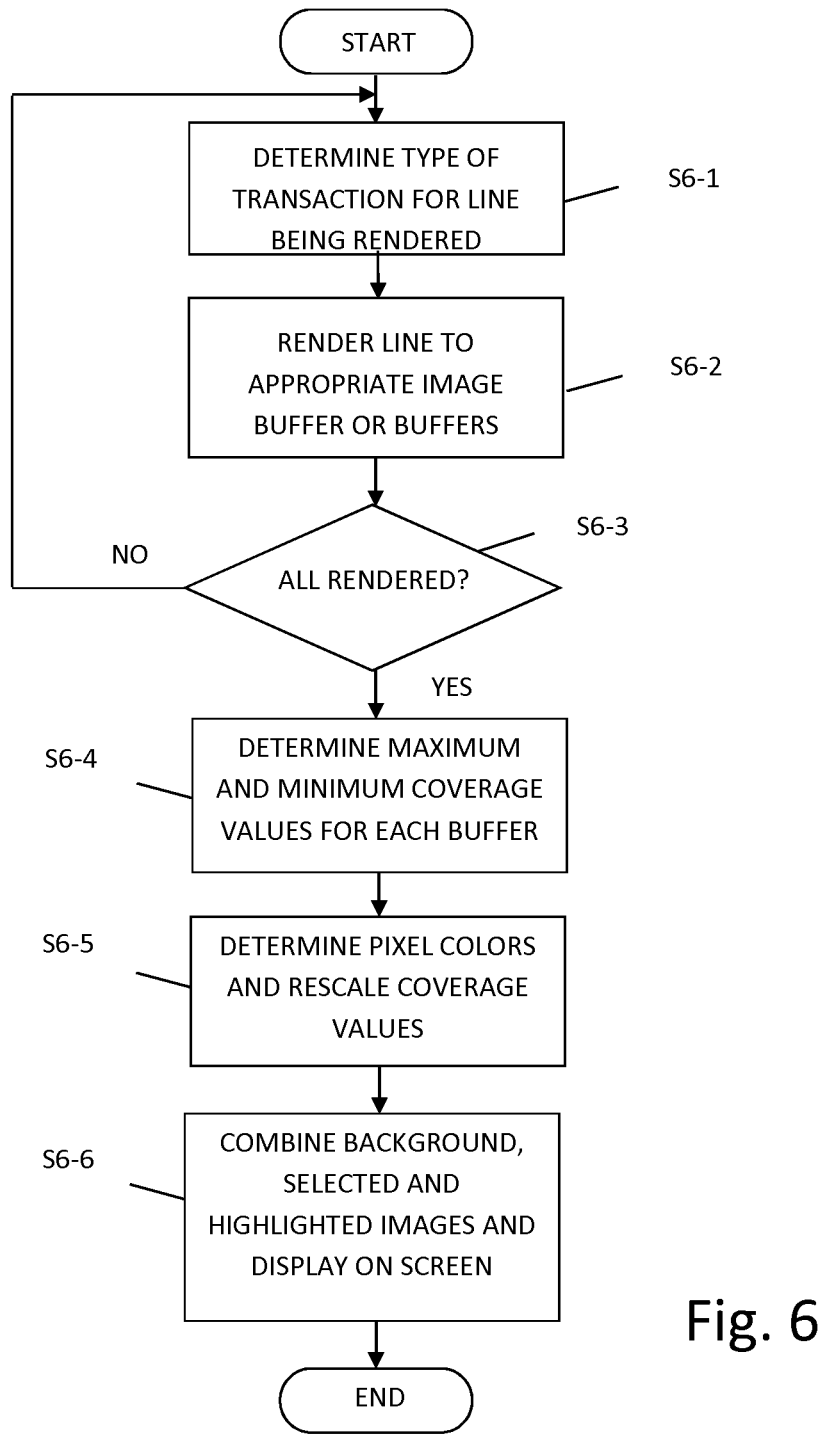
FIG. 6 is a flow diagram of the processing to generate an image display.

FIG. 6 is a flow diagram of the processing implemented to generate an image on a display that comprises a plurality of pixels, the image representing a plurality of transactions as lines on the display, in accordance with the methods described herein.

For each of the plurality of transactions, the processing unit 3 determines a type for the transaction (s6-1). As described above, lines representing each of the plurality of transactions can be a part of the background image (i.e. a background transaction), a part of the selected image (i.e. a selected transaction), and/or a part of the highlighted image (i.e. a highlighted transaction).

Depending upon the determined type of the transaction, the processing unit 3 then renders a line representing the transaction into the image buffer(s) associated with that type (s6-2). As described above, this rendering of a line representing a transaction into an image buffer involves using an anti-aliasing process to determine a coverage value for each pixel of the display, the coverage value representing the extent to which the line covers each pixel, and using this coverage value to cumulatively update the values stored in the image buffer for that pixel.

When the processing unit 3 determines (s6-3) that lines corresponding to all of the transactions have been rendered within the appropriate image buffers, the processing unit then (s6-4) proceeds to determine the maximum and minimum cumulative coverage values stored in each of the image buffers 60, 62, 64. More specifically, the processing unit 3 scans the background image buffer 60, the selected image buffer 62 and the highlighted image buffer 64. At each point in the scan the greatest and least cumulative coverage values in excess of zero (which corresponds to a complete absence of coverage) are determined. When the entire content of the image buffers 60, 62, 64 have been scanned, these maximum and minimum cumulative coverage values will define the extent to which the stored alpha values in each of the image buffers 60, 62, 64 vary (i.e. the range covered by these values).

The processing unit 3 then (s6-5) proceeds to convert the cumulative R, G, B values stored in the image buffers into color values. As has previously been described, when rendering lines into the image buffers 60, 62, 64, whenever a line is rendered to an image buffer, the R, G, B values for the pixels covered by the line are incremented by an amount corresponding to the R, G, B values for the correlating parts of the line scaled by the coverage value defining the extent to which the line covers the pixel. These cumulative color values can therefore be converted into a representative color by dividing each of the R, G, B values stored for each pixel by the A value for that pixel, as the A value is representative of the sum of the accumulated coverage values. If necessary, the resulting floating point values are then converted to 8-bit color data values. By way of example, if the graphics buffer 9 is arranged to store each value of an RGBA tuple as a floating point number in the range 0.0 to 1.0, then the values resulting from the division of the cumulative color values of a pixel by the accumulated coverage values of that pixel will also be in the range 0.0 to 1.0, such that these resulting values must then be multiplied by 255 to convert them into 8-bit color data values. Processing each of the R, G and B values in each of the image buffers 60, 62, 64 in this way causes the buffers to store conventional R,G.B color data values which range from 0 to 255 and hence can be used to represent a color on the screen.

Figure 7:
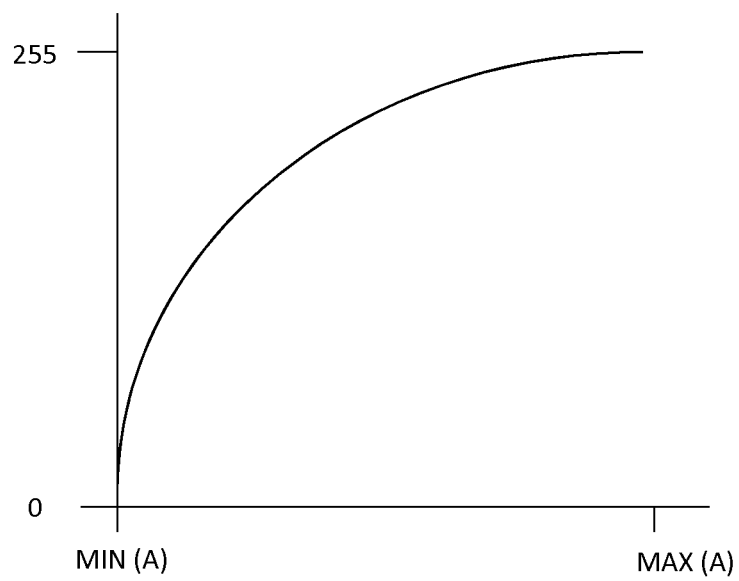
FIG. 7 is a graph illustrating a rescaling function for highlighting infrequent transactions.

Having converted the cumulative color values into 8-bit color data values for rendering an image on the display, the processing unit 3 then rescales the cumulative coverage values stored in each of the image buffers 60, 62, 64 using the determined maximum and minimum cumulative coverage values for the buffer 60, 62, 64. To do so, the processing unit 3 maps the range of cumulative coverage values that lie between the maximum and minimum across the 256 available conventional coverage (i.e. alpha) values, and then converts the cumulative coverage values of each pixel into the corresponding conventional alpha values (converts/calibrates across the range). This mapping of the cumulative coverage values across the 256 conventional 8-bit alpha values could be linear. However, in some embodiments, some kind of non-linear mapping may be preferable. For example, this non-linear mapping could include logarithmic or exponential mapping. Non-linear mapping may be preferable as means for making the lines that are used to represent outlier data more apparent and/or to de-emphasize lines that are used to represent data that could be consider normal/typical. FIG. 7 is a graph illustrating a rescaling function that could used in order to highlight lines that are used represent outlier data (e.g. lines that relate to infrequent transactions).

At this stage, each of the three image buffers 60, 62, 64 will store images where each pixel is associated with a R,G,B,A quadruple where the R,G,B, and A values each range from 0 to 255, the R,G,B color data values representing a color to be associated with a pixel and the A value representing an alpha channel value that is indicative of the transparency of the pixel which will be dependent upon the numbers and the extent of coverage of the lines at a particular portion of the display corresponding to the pixel in question. The processing unit 3 then (s6-6) proceeds to combine the images stored in the three image buffers 60, 62, 64 using an alpha blending process, and passes the resulting blended image 66 to the graphics buffer 9. The processing unit 3 then causes the blended image 66 stored in the graphics buffer 9 to be displayed on the display 11.

Alpha blending is a process in which multiple colored images can be combined based on the extent to which they are translucent/transparent, by using the alpha channel values associated with the corresponding pixels of each image, to thereby produce a new blended color. For example, when combining a foreground image and a background image, the transparency of each pixel of each image (as defined by the alpha channel value) may range from completely transparent to completely opaque. Therefore, if a pixel of the foreground image is completely transparent, the corresponding pixel of the blended image will be the color of the corresponding pixel of the background image. Conversely, if a pixel of the foreground image is completely opaque, then the corresponding pixel of the blended image will be the color of the corresponding pixel of the foreground image. Of course, the translucency/transparency of each pixel can range between these extremes, in which case the color of the pixel of the blended image is computed as a weighted average of the colors of the foreground and background images determined based on the respective alpha channel values.

As described above, the presence of a number of separate image buffers simplifies the update of the display by providing that when a user modifies a set of selected or highlighted transactions only the content of the corresponding buffer need be updated in order to update the displayed image. In this regard, when a user provides an input to the data visualization system 1 that selects or highlights one or more of the transactions represented on the display 11, to update the displayed image accordingly the processing unit 3 identifies the selected/highlighted transactions and proceeds to render lines representing each of the selected/highlighted transactions into the appropriate image buffer (i.e. either the selected image buffer 62 or the highlighted image buffer 64). This rendering of lines representing each of the selected/highlighted transactions to the appropriate image buffer proceeds according to the method described above.

When lines representing each of the selected/highlighted transactions have been rendered into the corresponding image buffer, the processing unit 3 converts the cumulative color values determined for the rendered lines into conventional 8-bit RGB color values and/or rescales the cumulative coverage values determined for the rendered lines into conventional 8-bit alpha channel values as described above, before combining the updated image stored within the selected/highlighted image buffer with the unmodified images stored in the other image buffers to generate an updated blended image for display on the display 11.

When rendering the lines representing each of the selected/highlighted transactions into the appropriate image buffer, the color values used for the lines should be chosen so as to ensure that the selected/highlighted transactions will stand out from/be apparent within the blended image. The blending of the images stored in the image buffers by the processing unit 3 could then involve effectively overlaying the selected/highlighted image on the background image by causing a cumulative color change for those pixels where the selected/highlighted image overlaps the background image.

Optionally, the blending of the images stored in the image buffers by the processing unit 3 could involve having the processing unit 3 determine, for each pixel of the background image overlapped by the selected/highlighted image, a complementary color to the color of the pixel, and including the complementary colors for each overlapping pixel when blending the images. In this regard, complementary colors are pairs of colors that when combined produce a neutral color; either white, grey, or black. The inclusion of the complementary color for each overlapping pixel would act to effectively cancel out the background image from the blended image at locations where the background image and the selected/highlighted image overlap, thereby improving the prominence of the lines that represent the selected/highlighted transactions.

Although in the above described embodiments the lines are described as being rendered in different colors (e.g. as each of the lines can be in different colors and/or each of the lines can vary in color along their length), it will be appreciated that in some embodiments all of the lines may be rendered using the same color. In such embodiments it will be appreciated that the processing of image data may be simplified as, rather than maintaining cumulative R, G, B color values for each pixel, it would only be necessary to maintain a record of the cumulative coverage of a pixel. Then, when all of the lines have been rendered into an image buffer and the maximum and minimum cumulative coverage values have been determined, the cumulative coverage values could then be scaled as has previously been described and then the image rendered based on the scaled coverage values together with R,G,B color data values corresponding to the uniform color being rendered.

In addition, although in the above described embodiments the graphics buffer 9 has been described as providing three separate image buffers 60, 62, 64 that are arranged to create image data for representing a background image, a selected image, and a highlighted image respectively, the graphics buffer 9 could equally comprise more than three graphics buffers if it is desired to generate a blended image comprised of more than three different types of image. Alternatively, if there is no need to generate a blended image, then the graphics buffer 9 could equally comprise a single image buffer.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A computer implemented method for generating an image on a display that includes a plurality of pixels, the image representing a plurality of transactions as lines connecting points in the display indicative of a source and an origin for the respective transactions, the method comprising:
   successively rendering lines via the computer, the lines representing each of the plurality of transactions into an image buffer, the rendering including:
   for each of the lines, using the computer to perform an anti-aliasing process to determine a coverage value for each pixel of the display, the coverage value representing the extent to which the line covers each pixel; and
   within the image buffer, maintaining a record of a cumulative coverage value for each pixel of the display;
   when the lines representing each of the plurality of transactions have been rendered into the image buffer, determining, using the computer, a maximum and a minimum of the cumulative coverage values stored in the image buffer;
   scaling, using the computer, the cumulative coverage value for each pixel based on the determined maximum and minimum cumulative coverage values; and
   rendering, using the computer, each pixel onto the display by using the scaled cumulative coverage value to determine a transparency for the pixel.

2. The method of claim 1, wherein the step of scaling the cumulative coverage value for each pixel based on the maximum and minimum cumulative coverage values uses any of a linear scaling function and a non-linear scaling function.

3. The method of claim 2, wherein the step of scaling the cumulative coverage value for each pixel based on the maximum and minimum cumulative coverage values uses any of a logarithmic scaling function and an exponential scaling function.

4. The method of claim 1, further comprising: when rendering the lines representing each of the plurality of transactions, for each of the plurality of lines, determining color values for each pixel of the display, the color values defining the color of the line at the location corresponding to each pixel, and within the image buffer maintaining a record of cumulative color values for each pixel of the display; and when the lines representing each of the plurality of transactions have been rendered into an image buffer, converting the cumulative color values for each pixel into color data values based on the cumulative coverage value for the pixel, and rendering each pixel onto the display using the color data values.

5. The method of claim 4, wherein the step of converting the cumulative color values for each pixel based on the cumulative coverage value for the pixel comprises: for each pixel, dividing each cumulative color value associated with the pixel by the cumulative coverage value associated with the pixel.

6. The method of claim 4, wherein the step of maintaining a record of cumulative color values for each pixel of the display comprises: scaling the color values of the line at the location corresponding to each pixel by the coverage value of the line at the location corresponding to the pixel, and incrementing each cumulative color value by the scaled color value.

7. The method as claimed in claim 4, wherein the color values for each pixel comprise a red channel value, a green channel value, and a blue channel value (RGB).

8. The method as claimed in claim 1, wherein the coverage value is an alpha (A) channel value.

9. The method as claimed in claim 4, wherein the image buffer stores a RGBA tuple for each pixel of the display, the RGBA tuple including a red (R) channel value, a green (G) channel value, a blue (B) value, and an alpha (A) channel value.

10. The method of claim 1, wherein the image buffer stores the cumulative coverage value of each pixel of the display as a floating point number.

11. The method as claimed in claim 4, wherein the image buffer stores the cumulative color values of each pixel of the display as a floating point number.

12. The method of claim 1, wherein lines representing transactions are rendered into one of a plurality of image buffers and the step of rendering each pixel onto the display comprises, for each pixel, combining the values from each of the plurality of image buffers and rendering each pixel onto the display using the combined value.

13. The method of claim 12, wherein the values from each of the plurality of image buffers are combined into a blended image using an alpha blending process.

14. The method of claim 12, and further comprising: for each of the lines, determining a type for the transaction represented by the line and, depending upon the determined type, rendering the line representing the transaction into one or more of the plurality of image buffers that are associated with the determined type.

15. The method of claim 12, and further comprising: updating the image on the display utilizing a user input identifying a subset of the plurality of transactions by: rendering lines representing each of the transactions in the subset into one of the plurality of image buffers, combining values from each of the plurality of image buffers, and re-rendering pixels onto the display using the combined values to generated an updated image.

16. The method of claim 15, wherein the step of combining values from each of the plurality of image buffers comprises cumulatively combining the color data values for each of the pixels from each of the plurality of image buffers.

17. The method of claim 15, wherein the step of combining values from each of the plurality of image buffers comprises, for each of the pixels, determining a complementary color to that of a color of the pixel of the image, and including the complementary color when combining the color data values for the pixel from each of the plurality of image buffers.

18. The method of claim 15, wherein the user input identifying a subset of the plurality of transactions specifies a type for the transactions in the subset, and the lines representing each of the transactions in the subset are rendered into one of the plurality of image buffers that is associated with the specified type.

19. A data analysis computer system for generating an image on a display that includes a plurality of pixels, the image representing a plurality of transactions as lines connecting points in the display indicative of a source and an origin for the respective transactions, the computer system comprising:

a graphics buffer operable to provide an image buffer for storing image data;
a display screen operable to display the image data provided by the graphics buffer; and
a processing module operable to:
successively render lines representing each of the plurality of transactions into an image buffer, the rendering including:
for each of the lines, using an anti-aliasing process to determine a coverage value for each pixel of the display, the coverage value representing the extent to which the line covers each pixel; and
within the image buffer, maintaining a record of a cumulative coverage value for each pixel of the display;
when the lines representing each of the plurality of transactions have been rendered into the image buffer, determine a maximum and a minimum of the cumulative coverage values stored in an image buffer;
scale the cumulative coverage value for each pixel based on the maximum and minimum cumulative coverage values; and
cause each pixel to be rendered onto the display by using the scaled cumulative coverage value to determine a transparency for the pixel.

20. A non-transitory computer readable medium storing computer implementable instructions which, when implemented by a programmable computer, cause the computer to generate an image on a display that includes a plurality of pixels, the image representing a plurality of transactions as lines connecting points in the display indicative of a source and an origin for the respective transactions, the steps of generating the image comprising:

successively rendering lines, via the computer, the lines representing each of the plurality of transactions into an image buffer, the rendering including:
for each of the lines, using the computer to perform an anti-aliasing process to determine a coverage value for each pixel of the display, the coverage value representing the extent to which the line covers each pixel; and
within the image buffer, maintaining a record of a cumulative coverage value for each pixel of the display;
when the lines representing each of the plurality of transactions have been rendered into the image buffer, determining, using the computer, a maximum and a minimum of the cumulative coverage values stored in an image buffer;
scaling, using the computer, the cumulative coverage value for each pixel based on the maximum and minimum cumulative coverage values; and
rendering, using the computer, each pixel onto the display by using the scaled cumulative coverage value to determine a transparency for the pixel.

* * * * *